United States Patent [19]

Pigott et al.

[11] 3,707,864
[45] Jan. 2, 1973

[54] PRESSURE VESSELS

[75] Inventors: Albert Edward Pigott, Clifton; Brian Tomkins, Bolton, both of England; Lionel Edward Raraty, deceased, late of Lythan St. Annes, England, by Hermanna Raraty, administratrix

[73] Assignee: United Kingdom Atomic Energy Authority, London, England

[22] Filed: March 9, 1970

[21] Appl. No.: 17,628

[30] Foreign Application Priority Data

March 17, 1969 Great Britain.....................13,991/69

[52] U.S. Cl. ........................................72/60, 72/272
[51] Int. Cl. ..............................................B21d 27/00
[58] Field of Search ............72/60, 253, 272; 220/10

[56] References Cited

UNITED STATES PATENTS

| | | | |
|---|---|---|---|
| 3,379,043 | 4/1968 | Fuchs, Jr. | 72/56 |
| 3,513,676 | 5/1970 | Green | 72/60 |
| 3,563,080 | 2/1971 | Alexander et al. | 72/60 |
| 3,467,273 | 9/1969 | Campbell et al. | 72/60 |
| 3,282,459 | 11/1966 | Wilson | 220/10 |

Primary Examiner—Richard J. Herbst
Attorney—Larson, Taylor and Hinds

This application filed under rule 47a.

[57] ABSTRACT

A pressure vessel of double ring construction comprising inner and outer concentric vessels with an annular interspace between the two vessels. Liquid is pressurized in the interspace to support the inner vessel. The inner vessel is supported without constraint from the outer vessel and the ends of the interspace are closed by joints which allow freedom of radial expansion of the ends of the inner vessel without giving rise to stressing of the adjacent ends of the outer vessel. In a particular arrangement the ends of the interspace are closed by sealed joints which make sliding contact with the end faces of the inner vessel.

6 Claims, 1 Drawing Figure

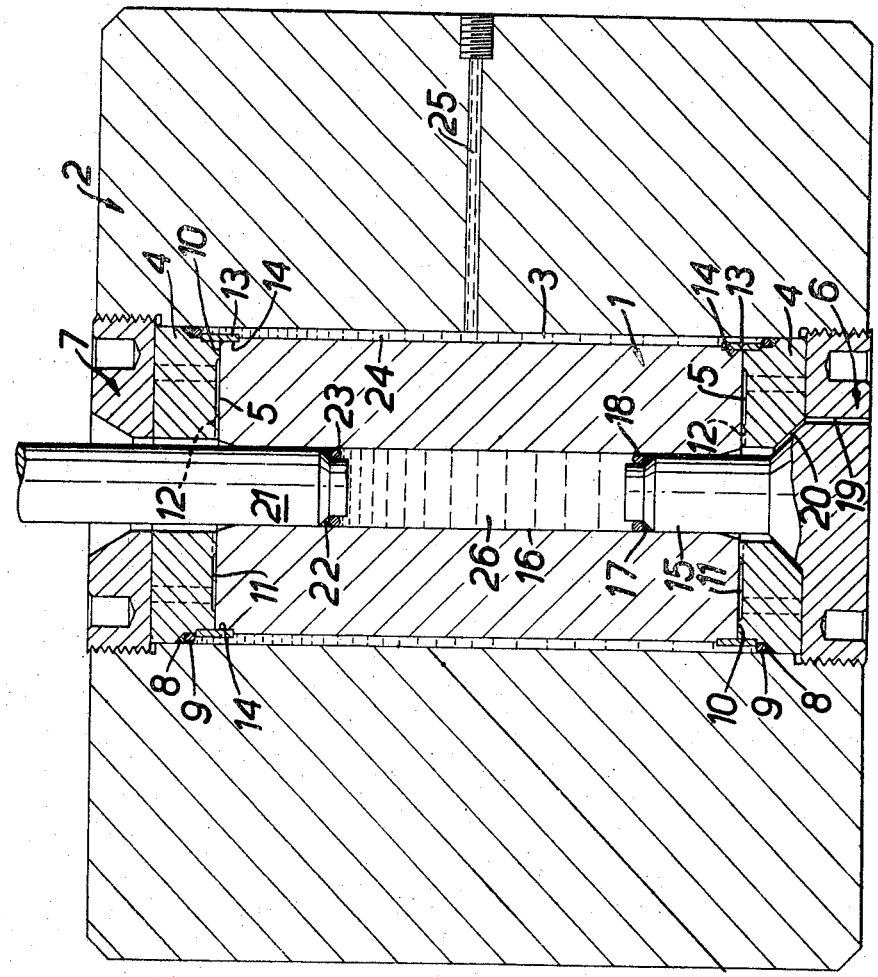

PRESSURE VESSELS

BACKGROUND OF THE INVENTION

This invention relates to pressure vessels and in particular to the type of pressure vessel which is of double ring construction comprising inner and outer concentric vessels with an annular interspace between the vessels. In such a pressure vessel liquid is pressurized in the interspace between the inner and outer vessels to apply a compressive hoop stress on the inner vessel. Thus, when internally pressurized the inner vessel is subjected to compressive or compressively biased strains, which has the effect of increasing the fatigue life of the inner vessel under internal pressure cycling conditions.

A seal has to be provided between the inner and outer vessels at the ends of the interspace between the vessels and in one arrangement this is achieved by having the ends of the inner vessel fitted in the bore of the outer vessel, the inner vessel being of reduced diameter between its ends to provide the annular interspace between the inner and outer vessels. This arrangement has a drawback when the inner vessel is subjected to internal pressure cycling. Cycling of pressure in the inner vessel causes it to expand and contract radially. The annular interspace between the two vessels prevents the expansion of the inner vessel from stressing the outer vessel over most of its length. However the cyclic expansion of the inner vessel is transmitted to the ends of the outer vessel where the ends of the inner vessel fit closely in the bore of the outer vessel. This cyclic stressing of the ends of the outer vessel can lead to rapid fatigue failure at the ends of outer vessel. This drawback applies in other arrangements, similar to the above, in which the ends of the annular interspace between the two vessels are closed by mechanical joints between the inner and outer vessels which can transmit the cyclic expansion of the inner vessel to stress the ends of the outer vessel.

SUMMARY OF THE INVENTION

According to the present invention a pressure vessel comprises inner and outer concentric cylindrical vessels with an annular interspace between the bore of the outer vessel and the outer surface of the inner vessel, means being provided for pressurization of fluid in the interspace between the inner and outer vessels to apply a supporting compressive hoop stress on the inner vessel, the ends of the interspace between the inner and outer vessels being closed by sealing means which allow radial expansion of the inner vessel under the application of pressure in fluid in the bore of the inner vessel without giving rise to stressing of the outer vessel by the radial expansion of the inner vessel.

In particular in such a pressure vessel the inner vessel is supported concentrically in the bore of the outer vessel without constraint against radial expansion by the outer vessel, the ends of the interspace between the inner an outer vessels being closed by sealing means which allow freedom of radial expansion of the ends of the inner vessel under application of pressure in fluid in the bore of the inner vessel without giving rise to stressing of the adjacent ends of the outer vessel.

The ends of the interspace between the inner and outer vessels may be closed by sealing members fixed and sealed in the ends of the bore of the outer vessel said sealing members having end faces in contact with the end faces of the inner vessel and sealing means being provided for preventing leakage of pressurized fluid from the interspace between the inner and outer vessels across the end faces of the inner vessel and the corresponding end faces of the sealing members.

DESCRIPTION OF THE DRAWING

One embodiment of the invention will now be described by way of example with reference to the single FIGURE of the accompanying drawing which is a longitudinal sectional elevation.

DESCRIPTION OF THE PREFERRED EMBODIMENTS

In the drawing there is shown a pressure vessel of double ring construction comprising an inner cylindrical vessel 1 and an outer vessel 2 concentric with the inner vessel. The inner vessel 1 is of smaller external diameter than the internal diameter of the outer vessel 2 so that an annular interspace 3 is defined between the vessels 1 and 2. An annular sealing ring 4 is fitted in each end of the bore of the outer vessel 2 in contact with the flat end faces 5 of the inner vessel 1. The sealing ring 4 at the lower end face 5 of the inner vessel 1 is located by a threaded plug 6 screwed into the lower end of the bore of the outer vessel 2. The sealing ring 4 at the upper end face 5 of the inner vessel 1 is located by a clamping ring 7 screwed into the upper end of the bore of the outer vessel 2. Each of the sealing rings 4 is sealed in the bore of the outer vessel 2 by a copper mitre ring 8 and a rubber O-ring 9. The end face 10 of the sealing ring 4 which is in contact with the upper end face 5 of the inner vessel 1 has an annular recess 11 which is connected by radial slots 12 with the inner edge of the sealing ring 4. The sealing ring 4 which is in contact with the lower end face 5 of the inner vessel 1 also has an annular recess 11 connected by radial slots 12 with the inner edge of the sealing ring 4. Leakage of pressurized liquid from the interspace 3 across the contacting end faces 5 and 10 of the inner vessel 1 and the sealing rings 4 is prevented by sleeve shaped nylon rings 13 which are fitted in recesses 14 around each end of the inner vessel 1 and the adjoining end of the coresponding sealing ring 4.

The end plug 6 has a part 15 fitting in the bore 16 of the inner vessel 1. The part 15 of the end plug 6 is sealed in the bore 16 of the inner vessel 1 by a copper mitre ring 17 and a rubber O-ring 18. A longitudinal vent hole 19 in the end plug, 6 connects with an interspace 20 between the plug 6 and the inner edge of the lower sealing ring 4. A plunger 21 is entered into the bore 16 of the inner vessel 1 through the clamping ring 7. The plunger 21 is sealed in the bore 16 of the inner vessel 1 by a copper mitre ring 22 and a rubber O-ring 23.

The contacting end faces 5 and 10 of the inner vessel 1 and the sealing rings 4 are lubricated, for example with molybdenum disulphide.

In an alternative arrangement seals are provided between the contacting faces 5 and 10 of the inner vessel 1 and the sealing rings 4 at the inner edges of the sealing rings 4, the nylon sealing rings 13 being omitted. In this case pressurized liquid in the interspace 3 has access to the contacting end faces 5 and 10 of the inner vessel 1 and the sealing rings 4 and provides lubrication between these faces. However this arrangement has a drawback in that the pressure of the liquid acting on the end faces 10 of the sealing rings 4 applies a large end load on the end plug 6 and the clamping ring 7 which requires disproportionate strengthening of the end plug 6 and the clamping ring 7.

In another arrangement the inner vessel 1 may be in the form of longitudinal annular segments having contacting radial faces. In this case the nylon sealing rings 13 are replaced by a single nylon sleeve covering the whole outer surface of the inner vessel and extending beyond the ends of the inner vessel to fit about the ends of the sealing rings 4. In this arrangement the nylon sleeve also prevents leakage of pressurized liquid from the interspace 3 between the contacting radial faces of the segments forming the inner vessel. Also a thin walled liner tube may be provided in the bore of the inner vessel to prevent leakage of pressurized liquid from the bore of the inner vessel between the contacting radial faces of the segments of the inner vessel.

In use of the arrangement shown in the drawing liquid 24 in the interspace 3 between the inner vessel 1 and the outer vessel 2 is pressurized, for example through a radial cross bore 25 in the outer vessel 2. The pressure of the liquid in the interspace 3 applies a compressive hoop stress on the inner vessel 1. The liquid in the interspace 3 is pressurized to a degree such that, when liquid 26 is pressurized in the bore 16 of the inner vessel 1 by loading of the plunger 21, the inner vessel is only subjected to compressive strains or compressively biased strains. Under these conditions the inner vessel 1 has a higher fatigue life than in the case of a vessel which is not supported by liquid pressure on its outer surface and which is therefore subjected to tensile straining. As the liquid 26 is pressurized in the bore 16 of the inner vessel 1, the vessel 1 will expand radially. The radial expansion at the ends of the inner vessel 1 is accommodated by sliding between the contacting end faces 5 and 10 of the inner vessel 1 and the sealing rings 4. Thus the radial expansion at the ends of the inner vessel 1 does not give rise to stressing of the adjacent ends of the outer vessel 2. This is an important advantage of the pressure vessel of the present invention over previous forms of liquid supported pressure vessels in which, with repeated use, the ends of the outer vessel are subjected to repeated tensile stressing by expansion and contraction of the inner vessel and which can lead to rapid fatigue failure at the ends of the outer vessel.

Should either of the nylon sealing rings 13 fail during operation liquid 24 from the interspace 3 will escape between the contacting faces 5 and 10 of the ends of the inner vessel 1 and the sealing rings 4. The escaping liquid will enter the annular recesses 11 in the faces 10 of the sealing rings 4 and will escape to atmosphere through the radial slots 12 which connect the annular recesses 11 with the inner edge of the sealing rings 4. In the case of the lower sealing ring 4 the liquid escaping through the radial slots 12 passes through the interspace 20 defined between the plug 6 and the inner edge of the lower sealing ring 4 and then through the vent hole 19 in the end plug 6.

The dimensions and operating parameters of a typical pressure vessel of the form shown in the drawing are as follows:

| | |
|---|---|
| Inner vessel 1, bore diameter | 1 inch |
| Inner vessel 1, outside diameter | 3.75 inches |
| Outer vessel 2, bore diameter | 4 inches |
| Outer vessel 2, outside diameter | 12 inches |
| Pressure of supporting liquid 24 in the interspace 3 | 45/tons/in$^2$ |
| Operating pressure of liquid 26 in the bore 16 of the inner vessel 1 | 80/tons/in$^2$ |

Finally one application of a pressure vessel as shown in the drawing is in the carrying out of a hydrostatic extrusion process. In this case the end plug 6 is formed as a die base with a central longitudinal drilling. An extrusion die is mounted on the upper end face of the end plug 6. Liquid is pressurized about a billet in the bore 16 of the inner vessel 1 so that the billet is extruded through the die and the extruded product emerges through the longitudinal drilling in the end plug 6.

We claim:

1. A pressure vessel comprising inner and outer concentric cylindrical vessels with an annular interspace between the bore of the outer vessel and the outer surface of the inner vessel, the inner vessel being supported concentrically in the bore of the outer vessel without constraint against radial expansion by the outer vessel, the ends of the interspace between the inner an outer vessels being closed by sealing members fixed and sealed in the ends of the bore of the outer vessel, said sealing members having end faces in contact with the end faces of the inner vessel, sealing means between the sealing members and the inner vessel to prevent leakage of pressurized fluid from the interspace between the end faces of the inner vessel and the end faces of the sealing members while allowing for sliding between the end faces of the inner vessel and the end faces of the sealing members, means for effecting pressurization of fluid in the bore of the inner vessel, and means for effecting pressurization of fluid in the interspace between the inner and outer vessels separate from the means for effecting pressurization of fluid in the bore of the inner vessel and independently of pressure cycles in said bore of the inner vessel.

2. A pressure vessel as claimed in Claim 1 wherein said means for effecting pressurization of fluid in the interspace between the inner and outer vessels comprises an external source of fluid at constant pressure, and means connecting the source of fluid with the interspace between the inner and outer vessels comprising a passageway passing through the wall of the outer vessel.

3. A pressure vessel as claimed in claim 1 wherein said sealing members fixed and sealed in the ends of the bore of the outer vessel have flat annular end faces corresponding to and in contact with the flat annular end faces of the inner vessel and said sealing means are provided between the outer edges of the annular end faces of the inner vessel and the outer edges of the corresponding annular end faces of the sealing members.

4. A pressure vessel as claimed in claim 1 wherein the sealing members fixed and sealed in the ends of the bore of the outer vessel have cylindrical extensions of the same diameter as the external diameter of the inner vessel, the cylindrical extensions of the sealing member having flat annular end faces in contact with the flat annular end faces of the inner vessel and said sealing means comprising a flexible garter shaped sealing ring circumferntially embracing each end of the inner vessel and the end of the cylindrical extension of the corresponding sealing member.

5. A pressure vessel as claimed in claim 1 wherein the inner vessel comprises a ring of part annular segments having contacting radial faces, the bore of the inner vessel being fitted with a liner sleeve and wherein the sealing members fixed and sealed in the ends of the bore of the outer vessel have cylindrical extensions of the same diameter as the external diameter of the inner vessel, the cylindrical extensions of the sealing members having flat annular end faces in contact with the flat annular end faces of the inner vessel and said sealing means comprising a flexible sleeve enclosing and sealing the outer surface of the segments of the inner vessel and extending beyond the ends of the inner vessel to embrace and seal about the ends of the cylindrical extensions of the sealing members.

6. A pressure vessel as claimed in claim 1 wherein the sealing members at the ends of the bore of the outer vessel are of annular form to permit a plug member to be fixed and sealed in one end of the bore of the inner vessel and to allow a fluid pressurizing punch to be entered into the other end of the bore of the inner vessel.

* * * * *